Sept. 1, 1953　　　　　　P. HOWDEN　　　　　2,650,814
KILN
Filed Nov. 1, 1950　　　　　　　　　　　　　2 Sheets-Sheet 1

Inventor
Peter Howden
By Watson, Cole,
Grindle & Watson
Attorney

Sept. 1, 1953 P. HOWDEN 2,650,814
KILN
Filed Nov. 1, 1950 2 Sheets-Sheet 2
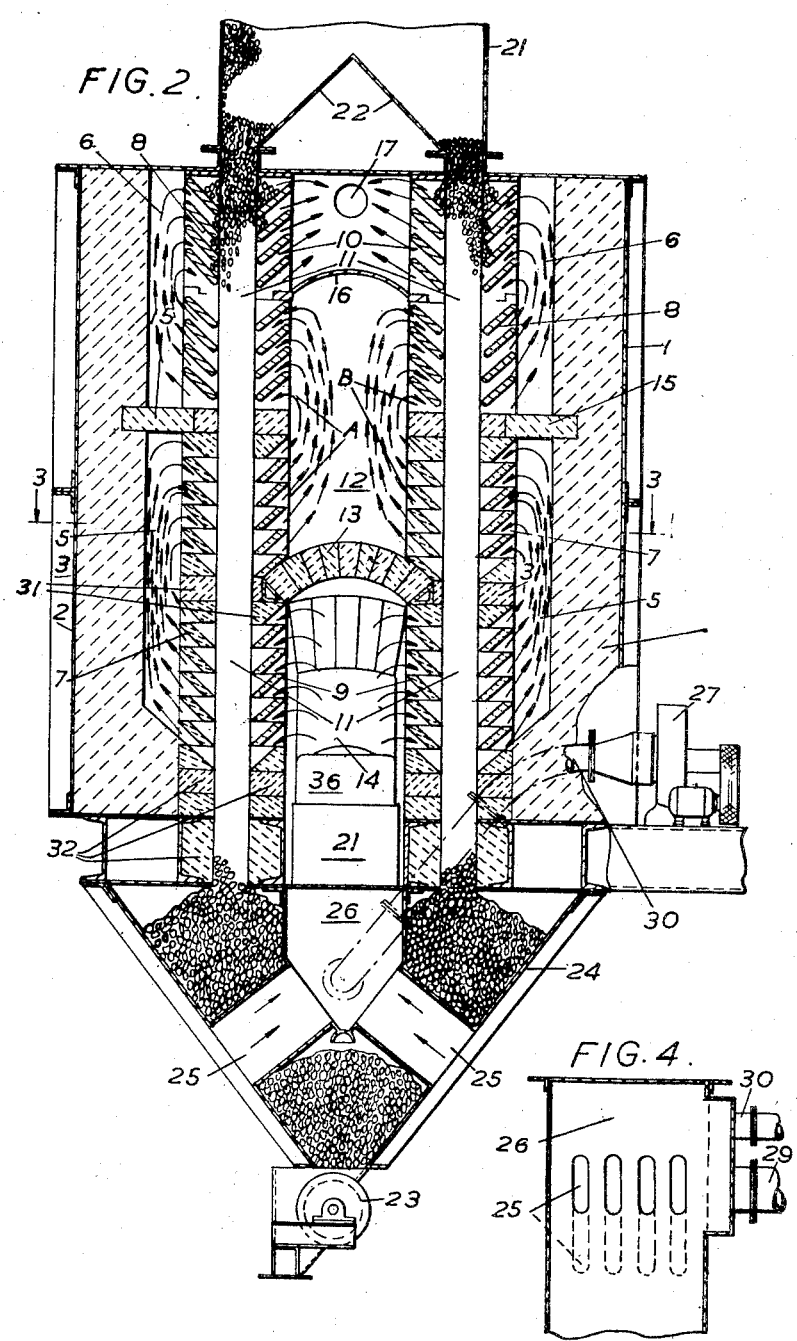
Inventor
Peter Howden
By Watson, Cole,
Grindle & Watson
Attorney Patented Sept. 1, 1953

2,650,814

UNITED STATES PATENT OFFICE 2,650,814

KILN

Peter Howden, Misterton, via Doncaster, England, assignor of one-half to Ernest Newell & Company Limited, Misterton, via Doncaster, England Application November 1, 1950, Serial No. 193,368
In Great Britain November 23, 1949

5 Claims. (Cl. 263—29)

This invention relates to kilns for heating, drying and calcining crushed ore, stone, or other broken material, and particularly suitable for material in small sizes, as is produced as waste in large quantities at many limetsone quarries all over the world. Material above 3″ cube is readily calcined, and that below ¼″ cube supplies the market with fine limestone, but at quarries primarily producing burnt lime it is usual to tip as waste large quantities between these sizes for which no market can be found.

The invention enables satisfactory treatment of material in even these small sizes to be carried out by making use of louvred walls (themselves of known construction) to contain a falling charge of material whilst it is subjected to the action of hot gases.

A kiln according to the invention comprises a pair of walls with inwardly sloping louvres, providing between them a space for a falling charge of material, means to charge material to the top of the space, means to discharge material from the bottom of the space, a combustion chamber contiguous to a low part of one of the walls, and a flue contiguous to the other wall and extending from a low part opposite to the combustion chamber to a higher part to direct hot combustion gases that have passed from the combustion chamber across the low part of the space to a higher part of the walls to cross the space in an opposite direction.

The material in the space between the louvred walls is thus subjected to the full temperature of the combustion gases in their first passage through it, the falling of the material through the space subjecting each part of it to the distributed transverse flow imposed on the gases by the louvres, and the subsequent flow of the gases in the opposite direction across the material assists in bringing the material towards the temperature it has eventually reached in the low part of the space. This low part will hereinafter be referred to as the "calcining zone." In general, the flow of material is continuous, as may readily be provided by continuous discharge, and uniform treatment results so long as the flow is maintained. The charging then requires to be continuous, for which purpose a hopper may be provided, the hopper itself being charged continuously or intermittently, whichever may be the more convenient.

It is most satisfactory for the conservation of heat and economy of construction for the furnace to be located inside louvre-contained material, so that the gases pass initially outwards from the furnace for calcining and then inwards in their next passage across the material, and for this purpose there may be two complete sets of louvred walls separated by a central chamber in the lower part of which the combustion chamber is contained, with external flues directing the gases upwards before their return across the material to the upper part of the chamber.

There may be provision for further flow of the gases through further louvres across the material, so that as the gases cool they serve for preheating (and, if necessary, drying) of the material before they leave the kiln. Whereas in the calcining zone and the immediately preceding zone the louvres need to be of refractory material, the louvres of earlier zones (preheating or drying) may be of metal such as cast iron, these louvres forming a continuation of the space that lies contiguous to the combustion chamber.

Provision may be made for the cooling of the material prior to its continuous discharge, e. g. by causing cooling gas (usually air) to pass across the material. Although a still lower part of the pair of louvred walls situated below the level of the furnace may be used to provide for the passage of cooling gas through the material itself, much as the heating gases have passed through the material, it is preferred to provide cooling channels around which the material passes, cooling gas being caused to pass through the channels. Air thus used for cooling may be supplied preheated to the furnace.

The kiln may be constructed in various sizes as required by large or small users, and for the latter purpose the compact construction lends itself particularly well to intermittent use, because it can be quickly brought to operating temperature, e. g. after a solid fuel furnace has been damped down over-night or a gas- or oil-fired furnace kept at an appropriately low consumption.

One construction of kiln suitable for the small user (though equally adaptable in design for larger construction) will now be described in greater detail with reference to the accompanying drawings, in which:

Figure 2 is a section, to a larger scale, taken on the line 2—2 of Figure 1;

Figure 4 is an enlarged detail of Figure 1.

Figure 1:
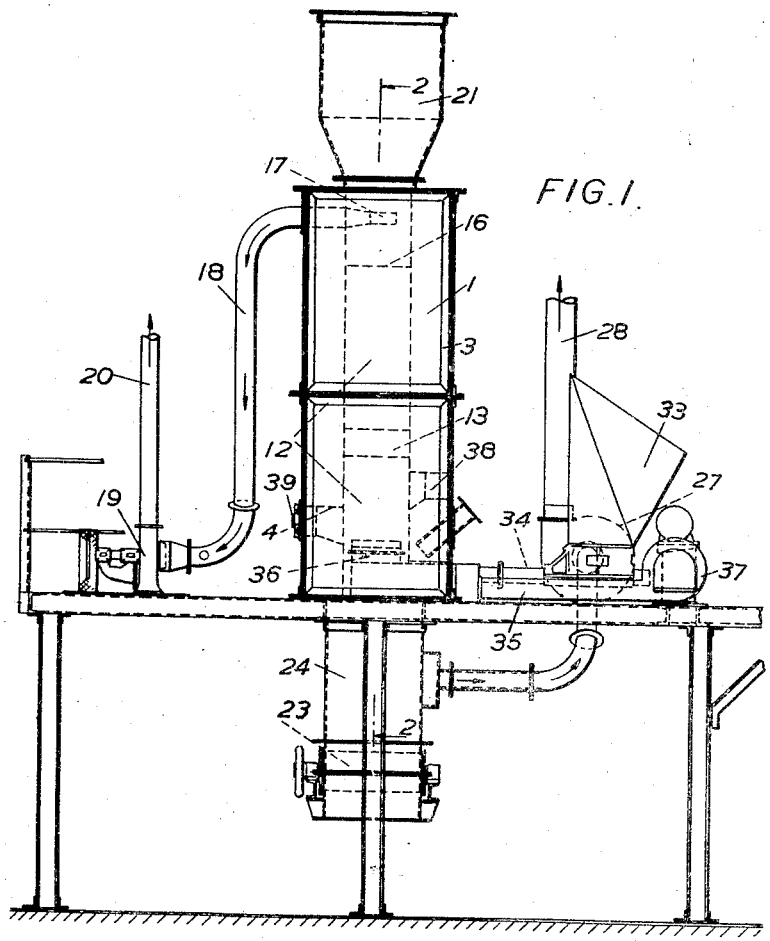
Figure 1 is an end elevation of the complete kiln and auxiliary plant.
Figure 3:
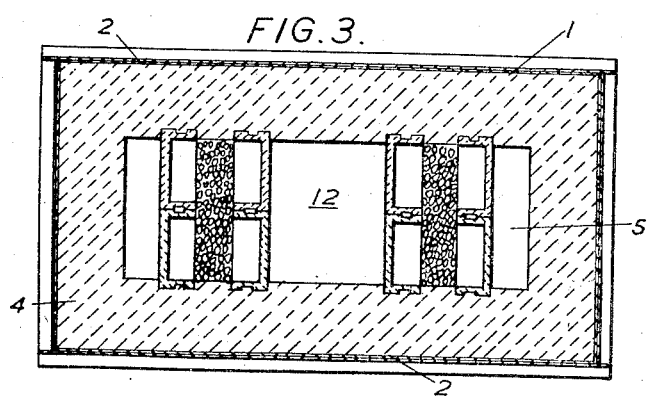
Figure 3 is a sectional plan taken on the line 3—3 of Figure 2.

The kiln proper 1 is rectangular, and encased in steel plates 2, suitably stiffened by angle irons 3. Within a refractory lining 4 and spaced by flues 5, 6 from the ends of the lining are two vertical sets of louvres A, B, each set comprising outer louvres 7, 8 and inner louvres 9, 10 inclined downwardly towards a vertical space 11 between them, and the two sets are separated by a vertical central chamber 12. The bottom third of the chamber is covered by a refractory arch 13 to form a combustion chamber 14, and the contiguous louvres 7, 9 are of refractory brick keyed into the sides of the lining 4. These refractory louvres extend above the level of the arch 13 to a level where the external flues 5 are stopped off by refractory bricks 15. Above this level, the louvres 8 are of cast iron, and at about half their height the central chamber is spanned by a cast iron arch 16. Above the arch 16 an outlet pipe 17 is provided for spent gases, which are drawn from the kiln through a duct 18 by an exhaust fan 19 discharging to atmosphere through a stack pipe 20.

A furnace or burner is disposed in the chamber 14, and the arrangement shown thus provides at each side of the kiln a four-part passage for the combustion gases, outwards through the material between the lower refractory louvres 9, 7 and up the lower flues 5 (calcining zone), inwards through the material between the upper refractory louvres 7, 9 to the part of the central chamber 12 above the arch 13 (pre-calcining zone), outwards through the material between the lower iron louvres 8, 10 to the upper flues 6, and back through the material between the upper iron louvres 10, 8 into the central chamber above the iron arch 16 (preheating and/or drying zone). Drying may be necessary if the material has been washed to free it from dust and soluble impurities, as may be required for the production of lime of relatively high purity.

A hopper 21 mounted above the kiln 1 has a divided bottom 22 leading to each of the vertical spaces between the louvres and keeps the spaces full of material as the material gradually falls on continuous discharge through a smooth or pocketed rotary valve 23 in the base of a discharge V-hopper 24 below the kiln. The sides of the hopper 24 have openings 25 in the form of flattened tubular channels leading to an air chest 26 from which air is drawn by an exhaust fan 27 discharging to atmosphere through a stack pipe 28. Some of the air may be taken for supply to the furnace, either from the inlet duct 29 of the fan 27, or separately by a duct 30 (Figure 4).

The zones of refractory louvres may be ended and separated from each other by solid bricks 31 providing continuations of the vertical spaces for the materials. Similar bricks 32 may connect the bottom of the calcining zones to the discharge hopper 24.

An underfeed stoker 33 may be used, the feed worm casing 34 and air duct 35 for which pass through one side of the kiln proper to a grate 36 in the bottom of the combustion chamber 14, and the usual forced draught fan 37 of the stoker may draw its air from that preheated in cooling the calcined product, e. g. via the duct 30. Secondary air may be supplied direct to the combustion chamber by an opening 38 in the side of the refractory lining 4, which opening may also serve as an inspection hole. A clinker door 39 is also provided.

Alternatively, an oil- or gas-fired furnace may be used; or the furnace may be hand-fired with any suitable solid fuel, including wood, a fire door being provided in a side wall of the lining. Again, the furnace may operate as a semi-producer. If desired, more than one furnace may be provided in the combustion chamber, e. g. if the lateral length of the louvres is extended to increase the capacity of any particular kiln.

Since all the combustion gases have to make repeated traverses through the material at different points in the descent of the material down the spaces between the louvred walls, each part of the material is subjected to the action of the gases. This is in spite of the small (and mixed) size of the material under treatment, which material for this reason cannot be treated in bulky masses as with the larger material ordinarily required for calcining, because the gases would find their way through channels in part of the bulk and leave other parts insufficiently treated.

In order to ensure free movement of the material down the spaces, the minimum distance between the louvred walls should be sufficient to avoid bridging. Practice has indicated that this distance should be at least five times the size of the largest pieces contained in the material.

With the combustion chamber located between two sets of louvred walls, the efficiency is very high, because all the combustion products must pass through the material to be treated, and heat losses can be kept low by suitable thickness of lining 4 completely surrounding the sides of the operating zones. Moreover, the tortuous path of the combustion gases through the material results in much of the sensible heat being abstracted before the gases leave by the outlet pipe 17.

The arrangement permits of solid, liquid, or gaseous fuel to be used, thus permitting the kiln to be installed wherever small material that would otherwise be wasted is found, and to make use of the most suitable fuel available in that locality. Moreover, shutting-down and re-starting offer no difficulty, and operating temperature is quickly reached, even from cold, so that the kiln neither needs to be run through the night nor damped down, but may be operated at intervals to suit small or irregular supplies of material. As the construction shown in the drawings demonstrates, the complete unit is compact, with simple supporting structure, all lending to easy transport, erection, and supervision.

The treated material is not contaminated by residual ash, as when fuel is charged intermittently with the material, and the indirect cooling by the tubes 25 prior to discharge avoids possible re-carbonisation of the material, as might result from contact with the cooling air.

What I claim is:

1. A kiln consisting of a unitary structure comprising an outer casing, a main body of refractory material enclosed by the casing, a central vertical chamber formed in the body and divided into a lower portion constituting a combustion chamber and at least one upper portion constituting a central flue, a furnace arranged within the combustion chamber, outer upper and lower flues formed in the body on each side of the central chamber, vertical unobstructed passages for confining a falling charge of material, said passages being disposed between the central chamber and the outer flues and each having at least inner and outer opposed louvred walls providing wide ducts for the passage of flue gases, the inner walls being contiguous with the central chamber and the outer walls with the outer flues, divisions in the louvred walls of each passage to form in the passage a lower calcining portion through which flue gases can flow directly from the furnace through the passage to the adjacent outer lower flue, the louvres of the calcining portion being of refractory material, an intermediate preheating portion through which the flue gases can flow from the outer lower flue through the passage to the central flue, and an upper drying portion through which the flue gases can flow from the central flue through the passage to the outer upper flue, a feed hopper surmounting the main body and leading directly to the vertical passages for supplying material continuously to the passages, a discharge hopper below the main body and communicating directly with the passages for continuously receiving the material gravitating down the passages, and means for inducing the flow of flue gases from the furnace through the calcining, preheating and drying portions of the passages.

2. A kiln as in claim 1 comprising in the discharge hopper a central compartment and tubular channels giving access of air to the central compartment, and means for extracting air from the central compartment to induce a flow of cooling air through the channels.

3. A kiln as in claim 2, comprising means for passing the air drawn through the tubular channels directly to the furnace.

4. A kiln as in claim 1, comprising metallic louvres in the walls of the drying portions of the passages.

5. A kiln consisting of a unitary structure comprising an outer casing, a main body of refractory material enclosed by the casing, a central vertical chamber formed in the body and divided into a lower portion constituting a combustion chamber, an intermediate portion constituting a central flue and an upper portion constituting an exhaust flue, a furnace arranged within the combustion chamber, vertical unobstructed passages for confining a falling charge of material, said passages being disposed between the central chamber and the outer flues and each having at least inner and outer opposed louvred walls providing wide ducts for the passage of flue gases, the inner walls being contiguous with the central chamber and the outer walls with the outer flues, divisions in the louvred walls of each passage to form in the passage a lower calcining portion through which flue gases can flow directly from the furnace through the passage to the adjacent outer lower flue, the louvres of the calcining portion being of refractory material, an intermediate preheating portion through which the flue gases can flow from the outer lower flue through the passage to the central flue, a first upper drying portion through which the flue gases can flow from the central flue through the passage to the outer upper flue and a second upper drying portion through which the flue gases can flow from the outer upper flue through the passage to the exhaust flue, a feed hopper surmounting the main body and leading directly to the vertical passages for supplying material continuously to the passages, a discharge hopper below the main body and communicating directly with the passages for continuously receiving the material gravitating down the passages, and means for inducing the flow of flue gases from the combustion chamber through the calcining, preheating and drying portions of the passages.

PETER HOWDEN.

References Cited in the file of this patent

UNITED STATES PATENTS

| Number | Name | Date |
| --- | --- | --- |
| 400,229 | Lauth | Mar. 26, 1889 |
| 1,199,856 | Zimmerman | Oct. 3, 1916 |
| 1,569,923 | Gudmundsen | Jan. 19, 1926 |
| 1,588,217 | Winkelman | June 8, 1926 |
| 1,871,166 | Fahrbach | Aug. 9, 1932 |
| 1,895,284 | Hay | Jan. 24, 1933 |
| 2,185,559 | Mohr et al. | Jan. 2, 1940 |
| 2,523,835 | Lepersonne | Sept. 26, 1950 |
| 2,552,063 | Robinson | May 8, 1951 |

FOREIGN PATENTS

| Number | Country | Date |
| --- | --- | --- |
| 139,665 | Austria | Dec. 10, 1934 |